July 7, 1931. E. E. EICKMEYER 1,813,349
VISIBLE FLOW DEVICE
Filed April 3, 1930 2 Sheets-Sheet 1
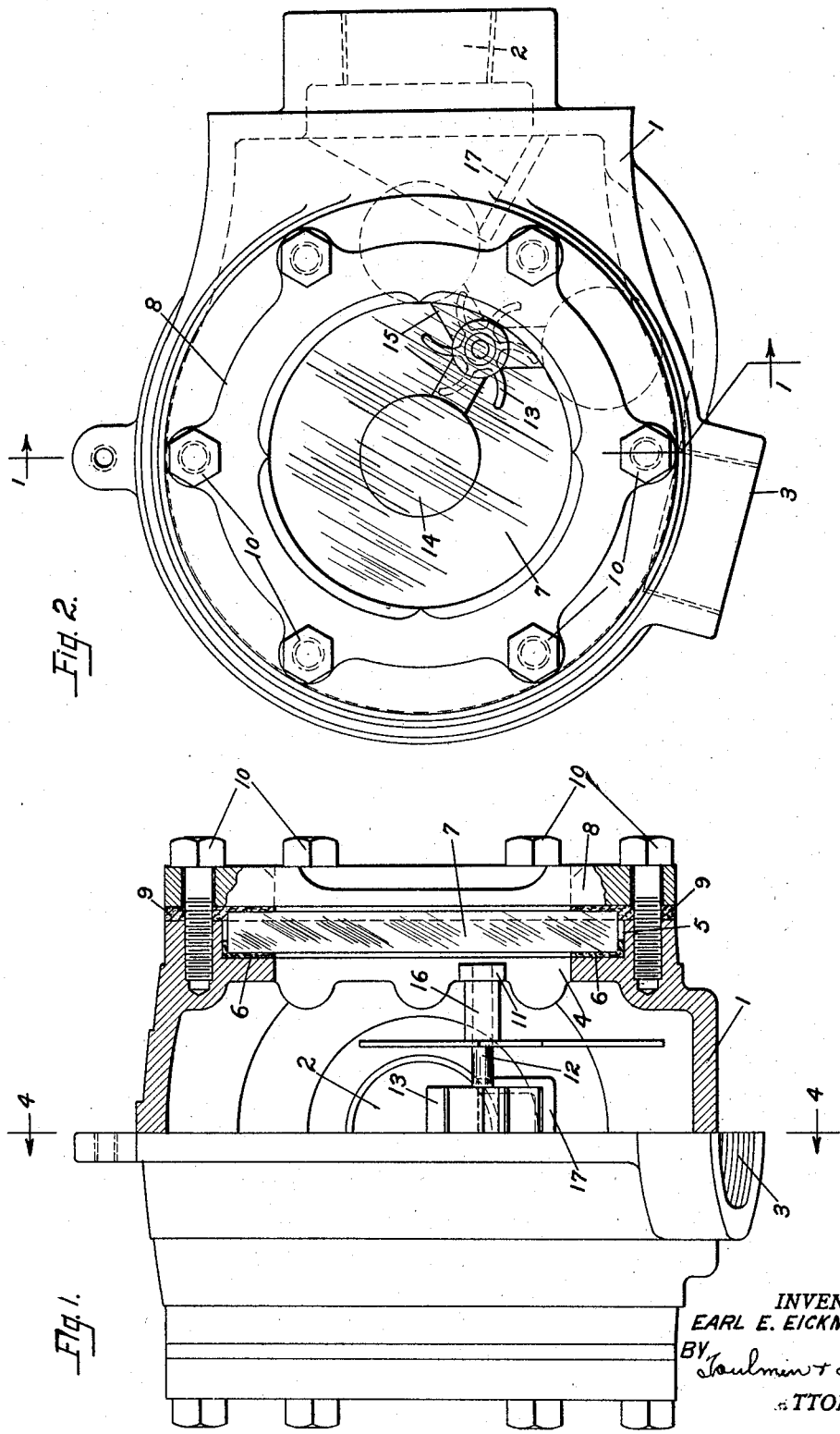
INVENTOR
EARL E. EICKMEYER.
BY Toulmin + Toulmin
ATTORNEY

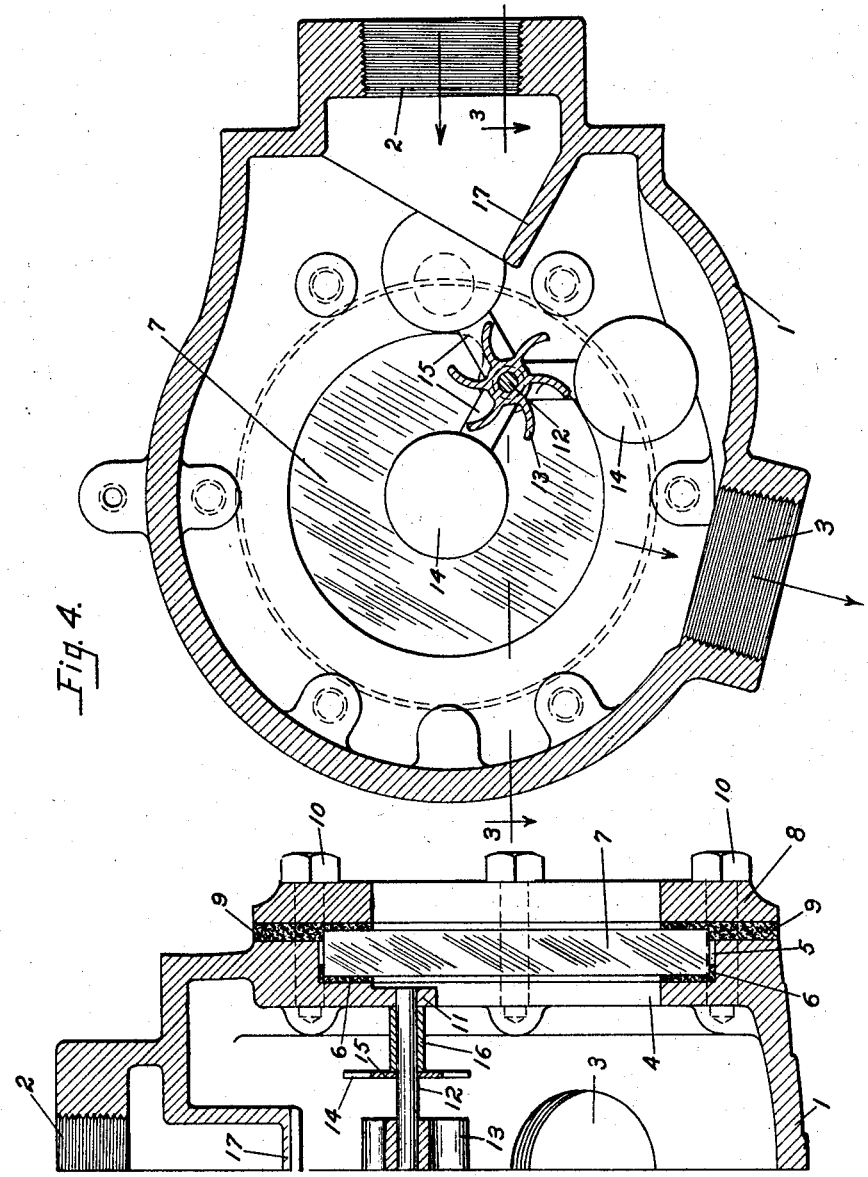

Patented July 7, 1931

1,813,349

UNITED STATES PATENT OFFICE

EARL E. EICKMEYER, OF DAYTON, OHIO, ASSIGNOR TO THE DAYTON PUMP AND MANUFACTURING COMPANY, OF DAYTON, OHIO, A CORPORATION OF OHIO

VISIBLE FLOW DEVICE

Application filed April 3, 1930. Serial No. 441,270.

This invention relates to a device adapted to be used in connection with gasoline pumps to indicate the flow of gasoline through the delivery pipe.

It is the object of this invention to provide an attachment adapted to be used in connection with pumps of this kind that has therein an inlet and an outlet for the flow of gasoline, and has in the path of the gasoline as it passes through the attachment a plurality of vanes so located that they are rotated by the flow of the gasoline passing through the attachment.

It is also an object of this invention to provide in connection with a case and a plurality of revolving vanes in the case, a window on each side so that the purchaser may by observation see the flowing gasoline passing through the case.

It is also an object of this invention to provide in connection with the rotating vanes a plurality of discs so mounted that as the gasoline passes and rotates the discs they will successively pass the line of vision so their movement may the more easily be detected and thereby the flow of the gasoline noted.

These and other objects will appear from the following description taken in connection with the drawings.

Referring to the drawings:

Figure 1 is a bastard section taken on the line 1—1 of Figure 2.

Figure 2 is a side elevation.

Figure 3 is a section on the line 3—3 of Figure 4.

Figure 4 is a section on the line 4—4 of Figure 1.

This device is for use in connection with delivery pipes in gasoline filling stations. It consists of a case 1 having an inlet 2 and an outlet 3. The inlet is attached to some stationary part of the pump, while the outlet has attached thereto the delivery hose or a pipe leading to the delivery hose.

The case is substantially cylindrical, having the inlet in one side and the outlet at little more than a right angle to the direction of flow through the inlet. Each end of the case is open, as indicated by the numeral 4. In each end of the case, adjacent the opening 4, is a seat 5. In this seat is an annular gasket 6 against which rests a plate glass plate 7. The gasket 6 is composed of cork and is shellacked in place to provide a gas-tight closure between the glass plate and the ends of the case.

For the purpose of holding the glass plate in position in the seat there is provided an annular cover ring 8, which has between it and the glass plate and the outer edges of the case a cork gasket 9, similar to the gasket 6 and similarly held in place. The rings 8 are held upon the case by means of screws 10. These screws extend through holes in the periphery of the annular ring, and into screw threaded holes in the case.

Extending from one side of the case within the inclosure thereof are brackets 11, each bracket having in its outer free end a hole which serves as a pivot for a spinner shaft 12. This shaft is made of any suitable material, such as brass, copper or any other material which might be suitable for use in this place. Upon this shaft and intermediate the ends thereof are spinner buckets 13. These buckets extend radially outwardly from the shaft and curve to form buckets against which the gasoline impinges or strikes as it passes through the case from the inlet to the outlet. These buckets are composed of aluminum and are attached to the shaft so that as they rotate the shaft rotates with them.

Located on each end of the shaft is a sleeve 16 which has extending therefrom radially a plurality of arms 15. These arms and the sleeves to which they are attached are composed of aluminum and have on each end thereof a disc-shaped vane 14, as shown in Figure 2. These vanes are of the same material as the arms and are adapted to revolve as the shaft rotates. The arms are made thin so that as the shaft rotates and the vanes revolve around the shaft they will bob up and down, due to the presence of the stream of gasoline passing through the case.

The spinner shaft 12 is located in one side of the case and to one side of the current of the stream of gasoline as it passes through the case from the inlet to the outlet. For the purpose of directing the stream of gasoline so that it will contact with the buckets and rotate the buckets and the vanes, there is provided a baffle plate 17, shown in Figure 4. This baffle plate directs the gasoline so it will contact with the bucket parts of the spinner shaft and rotate the spinner shaft and the vanes on the ends thereof.

The case is supported in an upright position, as shown in Figure 2, with the glass or window on each side of the case so that the person purchasing the gasoline will notice the rotation of the spinner and the revolution of the vanes around the spinner shaft and across the windows formed by the glasses 7. The revolution of the vanes can be seen from either side of the apparatus as the gasoline is being delivered through the discharge or delivery pipe. The vanes are supported by the thin arms so that as the gasoline flows by the vanes they will intermittently appear in succession so that the eyes of the purchaser may be more readily attracted thereby and the vanes more easily seen.

I desire to comprehend within my invention such modifications as may be clearly embraced within my claims and the scope of my invention.

Having thus fully described my invention, what I claim as new and desire to secure by Letters Patent, is:

1. A visible flow device consisting of a fluid passageway having oppositely disposed windows, and revolving vanes at one edge of said passageway adapted to revolve between the windows as fluid flows in the passageway.

2. A visible flow device consisting of a fluid passageway having a window therein, and revolving vanes at one edge of the passageway adapted to move across the window as the fluid flows in the passageway.

3. A visible flow device consisting of a case having vertically arranged and oppositely disposed windows therein, and vanes supported in said case adjacent the edges of the windows for revolving therein and adapted to revolve between said windows.

4. A visible flow device consisting of a case having vertically arranged and oppositely disposed windows therein, and vanes pivotally supported adjacent one edge of said windows and adapted to revolve through the space between the windows as fluid flows through the case.

5. A visible flow device consisting of a case having vertically arranged and oppositely disposed windows therein, a shaft supported by said case adjacent one edge of each of said windows, and spinner discs supported by said shaft for revolving through the space between the windows.

6. A visible flow device consisting of a case having a pair of vertically arranged and oppositely disposed windows therein, a shaft supported by said case adjacent one edge of each of said windows, and a spinner supported by said shaft for revolving through the space between the windows, said spinner including a plurality of vanes supported by radially extending arms and adapted to be revolved by fluid passing through said case.

7. A visible flow device consisting of a case having an angularly disposed inlet and outlet and a pair of vertically arranged and oppositely disposed windows between the inlet and the outlet, and a plurality of revolving vanes pivotally supported between the inlet and the outlet and adjacent one edge of each of the windows for revolving through the space between the windows.

8. A visible flow device consisting of a case having an angularly disposed inlet and outlet and a pair of windows in said case on opposite sides of the line of flow of fluid from the inlet to the outlet, and a plurality of revolving vanes pivotally mounted between the inlet and the outlet and adjacent the edges of said windows and adapted to be revolved through the space between the windows by the flow of fluid through the case.

9. In combination with a case having transparent walls and an inlet and an outlet for the flow of fluid through the case, a spinner consisting of a shaft supported by said casing, a plurality of thin metal arms extending from said shaft and a disc-shaped vane on the outer end of each arm adapted to extend between the transparent walls of the case.

10. In combination with a case having transparent walls and an inlet and an outlet for the flow of fluid through the case, a spinner consisting of a shaft supported by said case, a plurality of thin radially extending metal arms at each end of said shaft, and a disc shaped vane on the outer end of each arm adapted to extend between the transparent walls of the case.

11. In combination with a case having transparent walls and an inlet and an outlet for the flow of fluid through the case, a spinner consisting of a shaft supported by the case, a plurality of radially disposed blades intermediate the ends of said shaft, a plurality of thin radially extending metal arms at each end of said shaft, and a disc-shaped vane on the outer end of each arm adapted to be revolved by the flow of the fluid through the case.

12. In combination with a case having transparent walls and an inlet and an outlet for the flow of fluid through the case, a spinner consisting of a shaft supported by the case, a plurality of radially disposed curved blades intermediate the ends of said shaft, a plurality of thin radially extending metal arms at each end of said shaft, and a disc-shaped vane integral with the outer end of each arm adapted to be revolved by the flow of the fluid through the case.

13. In combination with a case having transparent walls and an inlet and an outlet for the flow of fluid through the case, a spinner consisting of a shaft rotatably supported by the case, a plurality of radially disposed buckets intermediate the ends of said shaft, a plurality of thin radially extending metal arms at each end of said shaft, and a disc-shaped vane integral with the outer end of each arm adapted to revolve between the transparent walls of the case.

14. In combination with a case having oppositely disposed windows therein and an inlet and an outlet for the flow of fluid through the case between the windows, a spinner consisting of a shaft rotatably supported by the case, a plurality of buckets on said shaft intermediate the ends thereof, a sleeve adjacent one end of the shaft, said sleeve having a plurality of radial arms, and each arm having on its outer end a disc-shaped vane, said vanes being adapted to revolve between the windows due to the action of the fluid on the buckets.

15. In combination, a case having an inlet and an outlet, a deflector lip adjacent the inlet of said case and projecting into the case, a spinner having buckets in the path of the liquid deflected by said deflector lip.

16. In combination, a case having an inlet and outlet, a deflector lip adjacent the inlet of said case, a spinner having buckets in the path of the liquid deflected by said deflector lip, and a disc connected to said spinner and rotated thereby through said case.

17. In combination, a case having an inlet and outlet, a deflector lip adjacent the inlet of said case, a spinner having buckets in the path of the liquid deflected by said deflector lip, a disc connected to said spinner and rotated thereby through said case, said case having a transparent window for observation of the movement of said disc.

18. In combination, a case having a transparent window in the side thereof, a spinner mounted on said case having an inlet and outlet, a deflector lip adjacent the inlet and said spinner, arms carried by said spinner, discs mounted on said arms arranged to successively appear one at a time through said window as said spinner operates.

19. In combination, a case having a transparent window in the side thereof, a spinner mounted on said case having an inlet and outlet, a deflector lip adjacent the inlet and said spinner, arms carried by said spinner, discs mounted on said arms arranged to successively appear one at a time through said window as said spinner operates, each of said discs being smaller in diameter than said window.

In testimony whereof, I affix my signature.

EARL E. EICKMEYER.